J. A. STEINMETZ.
AERIAL AIRCRAFT DESTROYER.
APPLICATION FILED JUNE 3, 1915.
1,166,489.
Patented Jan. 4, 1916.
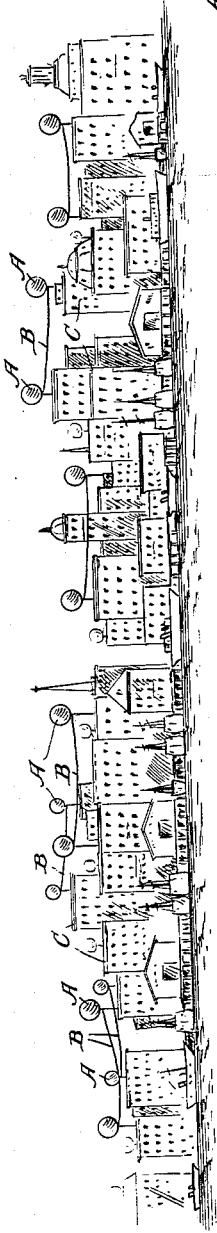
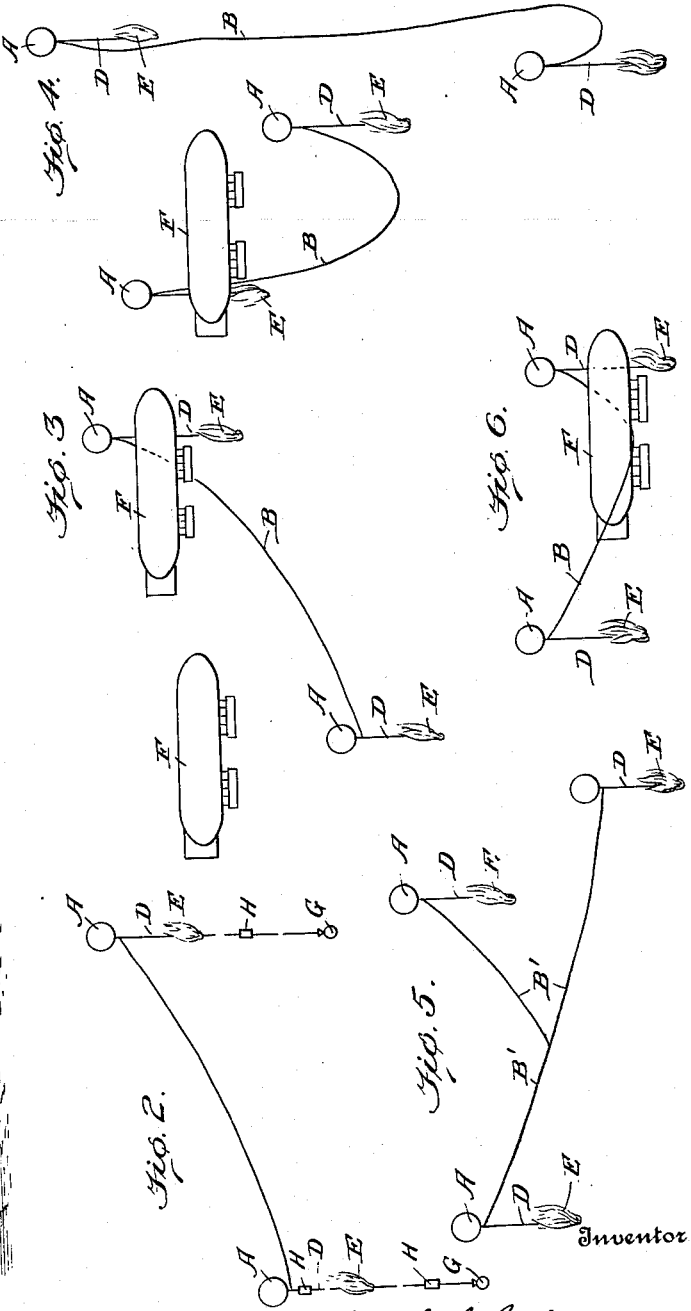
Witness
Edwin L. Bradford
Inventor
Joseph A. Steinmetz
By
Wallace L. Keene,
Attorney

UNITED STATES PATENT OFFICE.

JOSEPH A. STEINMETZ, OF PHILADELPHIA, PENNSYLVANIA.

AERIAL AIRCRAFT-DESTROYER.

1,166,489. Specification of Letters Patent. Patented Jan. 4, 1916.

Application filed June 3, 1915. Serial No. 31,896.

*To all whom it may concern:*

Be it known that I, JOSEPH A. STEINMETZ, a citizen of the United States, residing at Philadelphia, in the county of Philadelphia and State of Pennsylvania, have invented certain new and useful Improvements in Aerial Aircraft-Destroyers, of which the following is a specification, reference being had therein to the accompanying drawing.

This invention relates to means for safeguarding against attacking aircraft, especially craft of the dirigible type, and it involves suspending from small balloons torches which are adapted to burn for a long period, connecting the balloons in sets by light wire of any desirable length and at the proper time lighting the several torches and freeing the balloons, so that the torches may be carried into the air and be there free to move with such air currents as they may meet.

Figure 1 illustrates the use of many pairs of connected balloons secured on the roofs of more or less widely separated buildings. Fig. 2 illustrates flaming torches suspended, respectively, from each of two connected balloons in the air or in free flight. Fig. 3 illustrates a group of three dirigibles meeting two such pairs of balloons. Fig. 4 illustrates the positions assumed at first by such a pair of balloons when one is liberated at a considerable interval after the other is freed. Fig. 5 illustrates a set of three connected balloons in flight. Fig. 6 shows the wire connecting a pair of balloons and, in rising, engaging under the central portion of a single dirigible.

It has been shown practically that a dirigible, which has large carrying power, may quickly do enormous damage by dropping powerful explosives, and heretofore reliance for defense has been largely upon expensive special artillery. As the dirigible quickly passes from place to place, or from one town to another, comparative safety can be thus secured only by providing all towns with such artillery, an expedient that it has thus far not been found practicable to adopt. Moreover, where dirigibles attack a large city, regardless of the lives of non-combatants and of the character of property destroyed, they can hardly fail to cause great destruction if they drop explosives at random from a great height where they are in small danger of injury by gun fire.

Small balloons, quite capable of carrying upward the weight of suitable torches and the connecting wire can be made very quickly, inflated quickly when wanted for use, or can be guaranteed by the makers to remain inflated for a long period when desired. At small cost, a very great number of such sets of balloons may be provided, advantageously distributed, and in case of need may be set free, with lighted torches, by persons having little special training or skill. The balloons of any set rarely rise at exactly the same speed, and they will when in the air usually drift about constantly changing relative position in the eddies and currents usually existing on calm days, and a series of them will move in one general direction, at various heights when there is a wind. When the small smooth connecting wire of any set meets any obstruction such as is afforded by any aircraft, it slides one way or the other along such obstruction until the torch is brought into close proximity thereto, where it quickly attacks the envelop and by igniting the gas causes disaster.

In the drawings many pairs of balloons A connected by wires B are shown as attached to the buildings C of a town or city. From each balloon depends an incombustible cable or wire suspending a torch E at such distance below as not to endanger the balloon. If hostile dirigibles F appear, large numbers of these torch bearing sets are released at a time depending on conditions. If the hostile craft approach against the wind, the balloons are released early and allowed to drift toward the approaching craft, while if the attacking dirigibles approach with the wind, releasing is delayed so that the balloons may not rise in the rear of the advancing craft. It matters little how the hostile craft may engage any of the many connecting wires or be engaged by them since any engagement will rarely fail to bring a torch to the engaging point. Should two connected balloons be released at such intervals that they at first have the relative positions indicated in Fig. 4, the wire B, while approximately vertical may serve to engage an air ship and draw one or the other of the torches into effective position, and in any case the two balloons soon assume substantially the relative positions they would assume if released simultaneously.

As suggested in Fig. 5, more than two balloons may be used in a set, the wires B' connecting them being joined in any desired way, so that the probability of engaging aircraft, in rising, or later, may be increased.

In some instances, if not invariably, one or more contact bombs G, Fig. 2, will be suspended from the balloons directly or from the wires connecting them, the bombs preferably being of a type in which pressure completes a circuit and causes explosion, provided that the contact device is made operative when the balloons are released.

I prefer to insert or interpose in each wire which supports a torch or bomb a device H, without novelty herein claimed, adapted to be put in commission or not, as may be desired, when the balloons are freed, and if so put into active condition, to free the torch or bomb after a predetermined interval. With proper attention to the direction and velocity of the wind, it is possible to drop within a certain area, and with fair accuracy, a great number of incendiary devices, or bombs, asphyxiating or otherwise, and without any danger to those making use of the apparatus.

What I claim is:

1. The method of defending against hostile dirigible balloons, or the like, which consists in attaching suitable torches to widely separated small balloons connected in sets by wire and allowing the set to ascend to the plane of the hostile craft.

2. The method of protecting a town against destruction by dirigible balloons which consists in providing the town with numerous sets of small wire-connected widely separated balloons each bearing a suspended torch, releasably securing the sets in widely scattered positions, and lighting the torches and releasing the sets when it is desired to bring the torches into action.

3. The combination with a plurality of widely separated small balloons, of a wire connecting the balloons, and torches adapted to be carried upward by the connected balloons and suspended from the latter, respectively, by incombustible cables.

4. The combination with a set of widely separated, wire-connected, small balloons, of a set of incendiary torches suspended from the balloons by incombustible cables, and a contact bomb carried by the connected balloons at a distance from said torches.

5. The combination with a set of small balloons connected by cable, of wires depending from the unit so made up, devices suspended by said wires and adapted to exert a destructive force when dropped, and devices interposed in said wires and adapted to release the suspended devices at the expiration of a time fixed as desired.

6. The method of protecting a given area against aircraft which consists in providing said area with numerous widely scattered sets of widely separated wire-connected balloons releasably held in free air and supporting torches and contact bombs below the torches, lighting the torches and releasing the sets at proper times, so that the air above said area may afford no safe path for aircraft.

In testimony whereof I affix my signature.

JOSEPH A. STEINMETZ.